Aug. 26, 1930.  H. S. HELE-SHAW  1,773,797
METHOD OF AND APPARATUS FOR SEPARATING OUT AND
REMOVING MATTER SUSPENDED IN A FLUID
Filed March 13, 1923  4 Sheets-Sheet 1
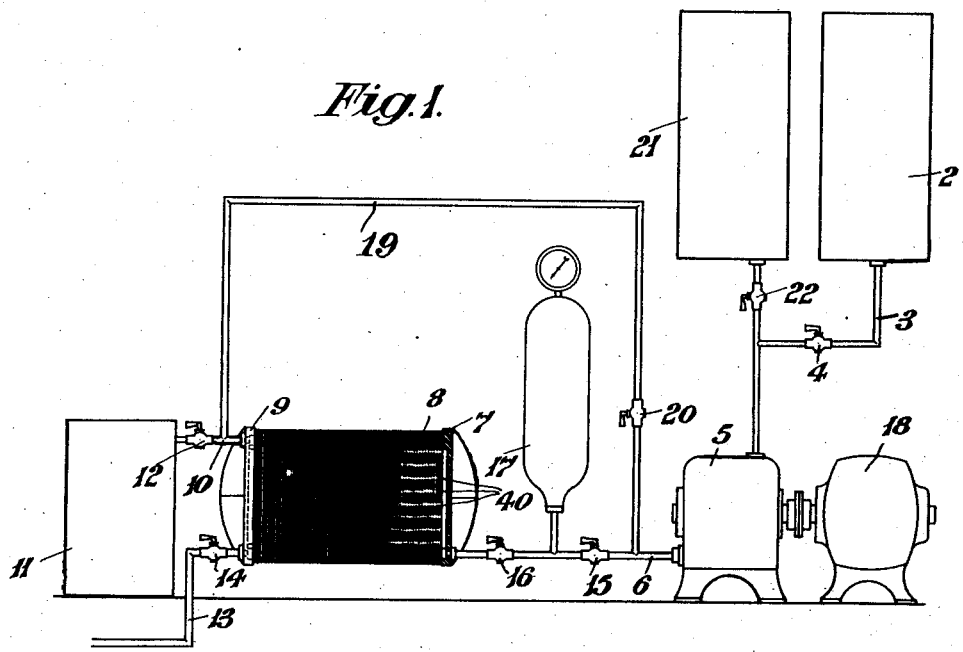
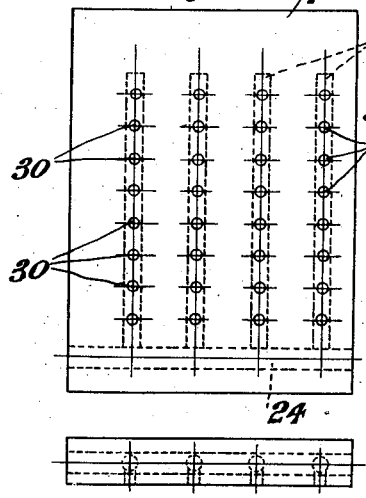
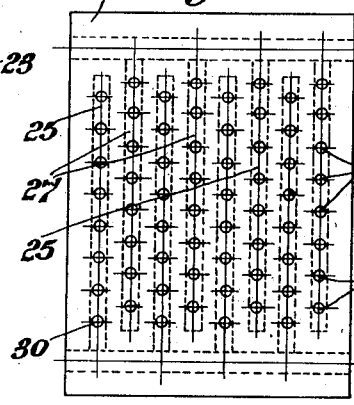
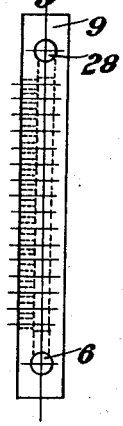

Aug. 26, 1930.  H. S. HELE-SHAW  1,773,797
METHOD OF AND APPARATUS FOR SEPARATING OUT AND
REMOVING MATTER SUSPENDED IN A FLUID
Filed March 13, 1923  4 Sheets-Sheet 2

Aug. 26, 1930.  H. S. HELE-SHAW  1,773,797
METHOD OF AND APPARATUS FOR SEPARATING OUT AND
REMOVING MATTER SUSPENDED IN A FLUID
Filed March 13, 1923  4 Sheets-Sheet 3

Aug. 26, 1930. H. S. HELE-SHAW 1,773,797
METHOD OF AND APPARATUS FOR SEPARATING OUT AND
REMOVING MATTER SUSPENDED IN A FLUID
Filed March 13, 1923   4 Sheets-Sheet 4

Patented Aug. 26, 1930

1,773,797

UNITED STATES PATENT OFFICE

HENRY SELBY HELE-SHAW, OF LONDON, ENGLAND

METHOD OF AND APPARATUS FOR SEPARATING OUT AND REMOVING MATTER SUSPENDED IN A FLUID

Application filed March 13, 1923, Serial No. 624,873, and in Great Britain July 19, 1922.

My invention consists in separating out and removing matter suspended in a fluid by the employment of a pack or packs of sheets or plates made of material impermeable to the fluid, and making the fluid flow between the adjacent sheets.

The sheets in the pack are brought close together by means of what may be called for convenience respectively front and back pressure heads, but not sufficiently close to prevent the fluid finding its way between the sheets. It is able to find its way between the sheets by reason either of the rough surface of the sheets allowing channels to be formed automatically by the fluid, or artificially by preparing such channels by embossing one or both sides of the sheets, impressing it with dies, or actually depositing or printing suitable lines to act as borders for the channels. It is obvious that the matter may be separated from the fluid in two ways. Firstly by forming these channels so that difference of density between the suspended matter and the fluid may effect separation either by gravity or inertia. Secondly if the distance between the sheets is sufficiently small, by actually preventing the matter in suspension entering the spaces between the sheets so that the fluid passes between the sheets deprived of the suspended matter. It is obvious that by such mechanical arrangement as screws, or by hydraulic pressure, the spaces between the sheets may be varied so that if desired a differentiation may be effected of the suspended matter, and by a series of processes different kinds of suspended matter may be eliminated from the fluid. Coarser particles are allowed to pass when there is less pressure between the end plates and therefore through the whole pack and consequently wider spaces between the sheets.

These coarser particles or bodies are prevented from passing when the pressure is greater and the spaces between the sheets are correspondingly diminished, thereby allowing only finer bodies to pass.

A similar variation of effect may be produced by depositing in different thickness the material forming the channel boundaries, or varying the embossing, or by having a coarser or finer surface on the paper, or by a combination of the two, or even by interposing between the sheets themselves other sheets such as stencil sheets of different thickness in which the required channels are formed. If the method of separation by difference of density is used and some or part of the suspended matter is allowed in the channels, then differentiation may be effected simultaneously between the sheets while coarser particles or even actual organisms may be altogether excluded from entrance.

Even in the sheet itself further differentiation may take place depending on the speed with which the flow of the fluid takes place and the form of the channels employed.

The sheets need not necessarily be flat, conical or cylindrical surfaces for instance may be employed, but I prefer to use flat sheets, and in order to avoid the necessity of putting the packs of sheets or plates in a retaining vessel which would require to be under pressure, and in order to deal with sufficient quantity for practical purposes, I proceed as follows:—

Each sheet in the pack is similarly perforated with one or more holes. When more than one hole is used the holes are preferably arranged in alternate rows, such rows being alternately employed for entrance and exit of the fluid. It will be obvious that when the sheets are placed together in the pack with the holes all registering, those with the single hole form a cylindrical tube, while the rows of holes form rows of cylindrical tubes. If the pressure heads have holes or apertures so that the front pressure head communicates by means of these apertures with the rows of cylindrical tubes by which the fluid is admitted to the pack, and the back pressure head has apertures communicating with the row of cylindrical tubes by which the exit of the fluid is obtained, then it is obvious that if these pressure heads form a fluid-tight joint with the front and back sheets of the pack respectively, there is no other way of escape for the fluid under pressure but by passing through the channels above described, the fluid passing either depositing the suspended matter or residuum in the inlet tubes, or leaving it partly there and partly in the channels or altogether in the channels, the filtered fluid, or filtrate finally passing out by the exit tubes and through the back pressure head or, to a small extent, out round the periphery of the sheets. The latter exit can be prevented by impressing or depositing a border upon the individual sheets. If only one hole is used a large internal periphery is possible and all the filtered fluid can escape by the outer periphery of the sheets and be caught in a suitable casing.

The next point to be explained is the manner in which the deposited matter may be removed either from the inlet tubes or from the prepared portions of the actual channels. To remove the matter from the tubes a series of openings or apertures can be arranged in the back pressure head communicating with the end of the inlet tubes opposite to that at which the fluid is admitted. At intervals, as required, it is merely necessary to open a cock or valve by which the foregoing apertures in the back pressure plate are closed, when, the end of the tube being open to the atmosphere, the whole pressure which is required normally to force the fluid through the narrow channels, is sufficient to expel the suspended matter which has been deposited in the entrance tubes. If by any means the suspended matter should have choked the tubes by solidifying and cannot be washed out, a contrivance of rods may be arranged by which the foregoing matter may be pushed out.

In order to remove any finer material which may have been deposited in the channels between the sheets the direction of flow in the whole apparatus may be reversed, and a washing out fluid under pressure may be employed. It will thus be seen that the separating appliance may be employed continuously without being dismantled, and the process made continuous by the mere operation of taps or valves.

It is obvious that any material that is impermeable to the fluid may be employed for the sheets, but for purposes of economy as well as reduction in weight and volume, I prefer to employ, as a rule, specially prepared paper, which may be waterproof, oilproof, or prepared to resist various kinds of chemical action. Such sheets of paper may be rough on both sides, or smooth on one side and a desired pattern on the other, and perforated as required. Where filtration of a viscous substance, such as oil, is required the viscosity may be diminished by heating or any other means, and special tubes may be arranged for the passage of steam or other heating substances through the pack, or the fluid may be suitably heated before entering the appliance.

Each hole in the inlet row may be regarded as what is known as a 'source' and each hole in the outlet row may be regarded as what is known in mathematics as a 'sink', the two forming what may be called a unit, the motion of the fluid in general passing from a source to a sink partaking of stream line motion. It is obvious that the capacity of any separator may be measured by the number of such units, the number of units being multiplied indefinitely. Each sheet may contain a large number of units, and a pack a large number of sheets, and the product of the two represents the number of units operating simultaneously in one pack. By having the press heads suitably formed, a number of such packs can be placed in a continuous row and pressed together by a screw or hydraulic ram, such combination constituting one press. The number of such presses, as will be shown and illustrated, combine to form a complete separator or filter.

It is thus obvious that a very large number of units may be simultaneously operated by this method and any required amount of fluid may be dealt with within a moderate space. No great increase of labour is involved with increase of capacity as the quantity of material to be dealt with is increased, since under normal conditions no dismantling is required.

An embodiment of the invention showing alternative constructions of filter plates is illustrated by the accompanying drawings wherein:

Figure 1 is a general view of a fluid filtering plant.

Figures 2, 3 and 4 are respectively face elevation, plan and side views of an end inlet plate and Figures 5, 6 and 7 are similar views of an outlet plate both of a filter press using perforated sheets of paper between the inlet and outlet plates.

Figures 10, 11, 12 and 13 are respectively end, face and sectional views of an inlet plate of the press, Figure 12 being a section through A—A Figure 11, while Figure 13 is a section through B—B Figure 11.

Figures 14, 15, 16 and 17 are similar views of an outlet plate, Figure 16 being a section through C—C Figure 15, while Figure 17 is a section through D—D Figure 15.

Figure 9:
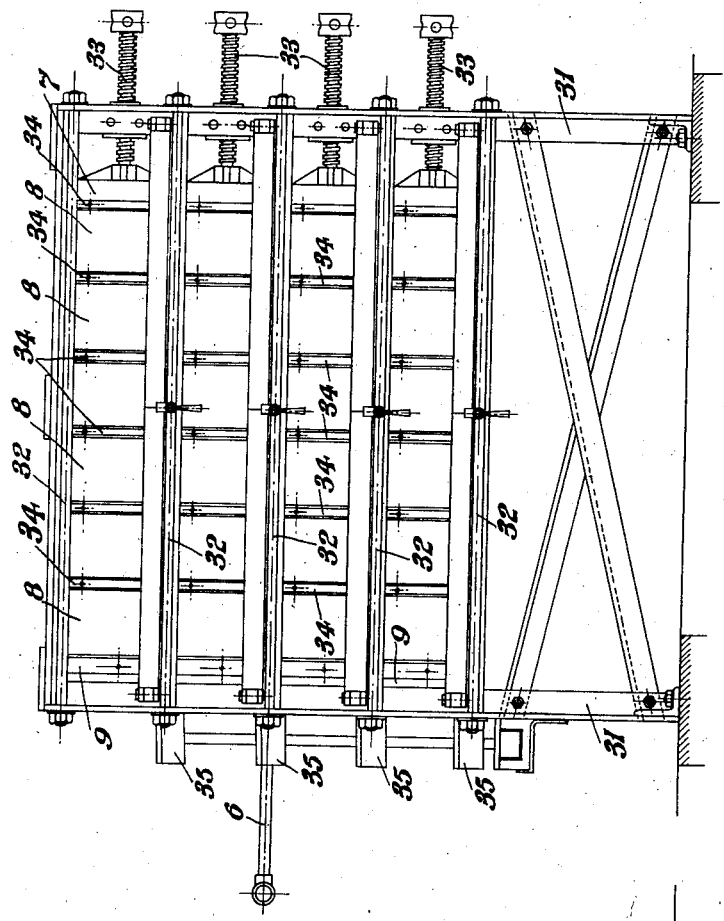
Figures 8 and 9 are respectively end and side views of a modified construction of filter press.

In the filter press shown in Figure 1 the fluid to be filtered is stored in a tank 2, having an outlet 3 provided with a valve 4 and leading to the inlet of pump 5 driven by a motor 18. The outlet 6 of the pump 5 delivers fluid to an inlet end plate 7 of a filter press containing a series of plates 8 having a number of suitable spaced perforations 40 and held in the usual manner between inlet plates 7 and outlet plate 9. The outlet plate 9 is provided with a fluid discharge outlet 10 leading to a filtered fluid receptacle 11 and provided with a valve 12. The outlet plate 9 is also provided with a drain pipe 13 provided with a valve 14. The inlet pipe 6 is provided with valves 15 and 16 between which is arranged an air vessel 17. The filter is provided with a bye-pass 19 containing a valve 20. The inlet pipe to the pump is also connected to a tank 21 containing washing out fluid of which the supply is controlled by a valve 22.

During the normal working of the plant the valves 4, 15, 16 and 12 are opened and the valves 22, 20 and 14 closed when fluid from the reservoir 2 is pumped through the pipe 6 into and through the plates 7, 8 and 9 of the press into the filtered fluid reservoir 11.

When it is desired to clean the filter the valves 4, 20 and 12 are closed and 22, 15, 16 and 14 opened, when washing out fluid from the tank 21 is forced by the pump through the filter to the drain pipe 13 carrying deposits in the filter with it, and when it is desired to force washing water through the filter press in the reverse direction either or both of the valves 15 and 16 is or are closed and the bye-pass valve 20 opened, the valves 4 and 12 being closed while 22 and 14 are opened as before.

To enable the fluid to be passed through the plates in the above manner the end plates of the filter are constructed as shown in Figures 10 to 17, and the filter plates 8 are in this embodiment of the invention perforated with vertical rows of perforations all registering with one another. These perforations are divided by means of the specially constructed end plates into two series of groups or vertical rows. Every alternate vertical row of the perforations 40 opens into channels 23 in the inlet plate, these channels open into a common channel 24 into which opens the inlet 6 from the pump 5. The series or groups or rows of filter plate perforations opening into channels 23 form passages which at their opposite ends open into channels 25 in the outlet plate of the press, and these channels open into a common channel 26 into which opens the drain pipe 13. This drain pipe however, during the normal working of the press is closed so that fluid pumped into the channels formed by the perforations can only escape between the plates to the other or alternate series of groups of perforations, and in doing so deposit the suspended matter in the passages formed by the registering perforations 40, and which is removed by the cleansing operation described above.

The filtered fluid passing between the plates 8 to the alternate series of groups of perforations 40 passes through passages formed by these perforations 40 into a second series of channels 27 which open into a common channel 28 which opens into the outlet pipe 10 delivering filtered fluid into the reservoir 11.

The filter plates 7 and 9 are provided with bolt holes 29 through which bolts are passed for holding the plates together in the usual manner.

Figures 2 to 7 illustrate a modification of the end plates 7 and 9 for use in the same manner as described with reference to Figures 10 to 17, the channels 23 to 28 instead of opening directly into the faces of the plates open through perforations 30 registering with the perforations 40 in the filter plates 8.

Figure 8:
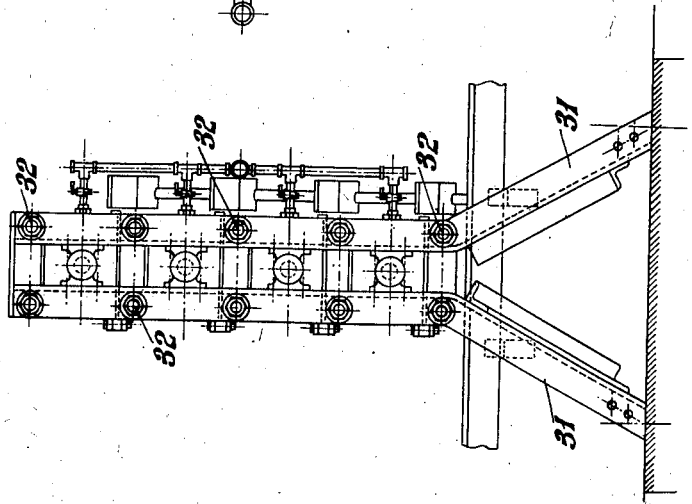
Figure 10:
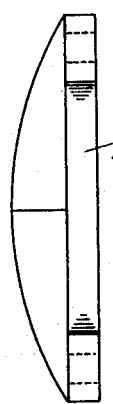
Figure 11:
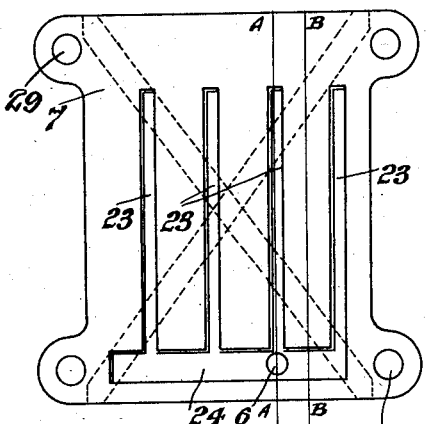
Figures 12, 13:
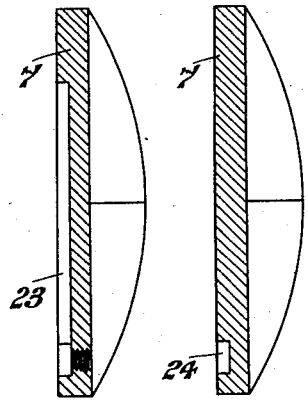
Figure 14:
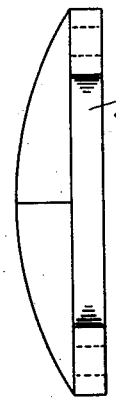
Figure 15:
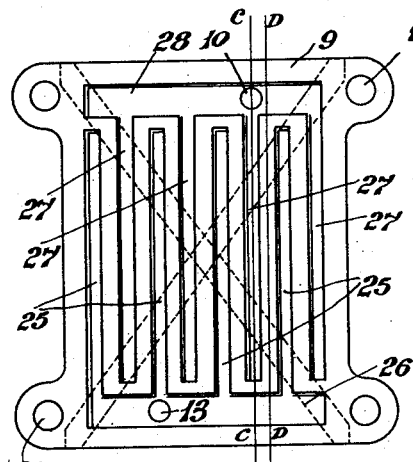
Figures 16, 17:
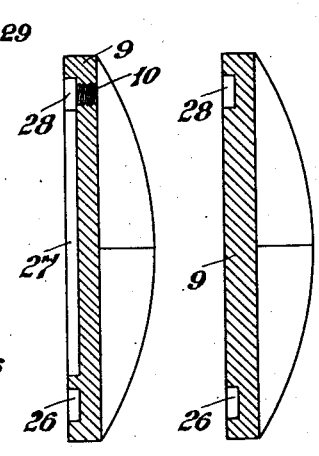
Figure 18:
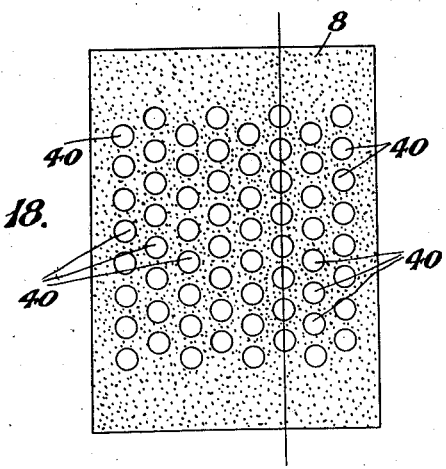
Figures 18 and 19 are respectively face and sectional views of a paper filter plate.
Figure 19:

In the modified construction of press shown in Figures 8 and 9, the press has a supporting standard 31 having longitudinal bolts 32 which hold the plates in position so that they can be pressed together by screws 33 in the usual manner. In this modification the filter plates 8 between the end plates 7 and 9 are divided into groups separated by correspondingly perforated metal plates 34. This modification also shows four sets of filter plates arranged one above the other in a vertical column and provided with filtrate drain channels 35.

The press may be provided with mechanical means such as screws, levers or hydraulic pressure for the purpose of relieving the pressure and thereby opening the spaces between the individual sheets in order to permit more effective washing out material which may be deposited between the sheets, without necessitating the dismantling of the separating apparatus as a whole.

The filter plates may be made of paper having a grain or matt surface, or have projections or raised borders formed thereon by printing, or by depositing and securing thereon any suitable substance.

The provision of plates having registering perforations 40 renders the cleaning of the passages formed thereby possible, by the insertion in such passages of rods or cleaning devices.

The inlet and outlet holes formed by the registering perforations in the sheets, need not be of the same size, for instance it may be an advantage to have the inlet holes larger than the outlet holes.

Figure 20:
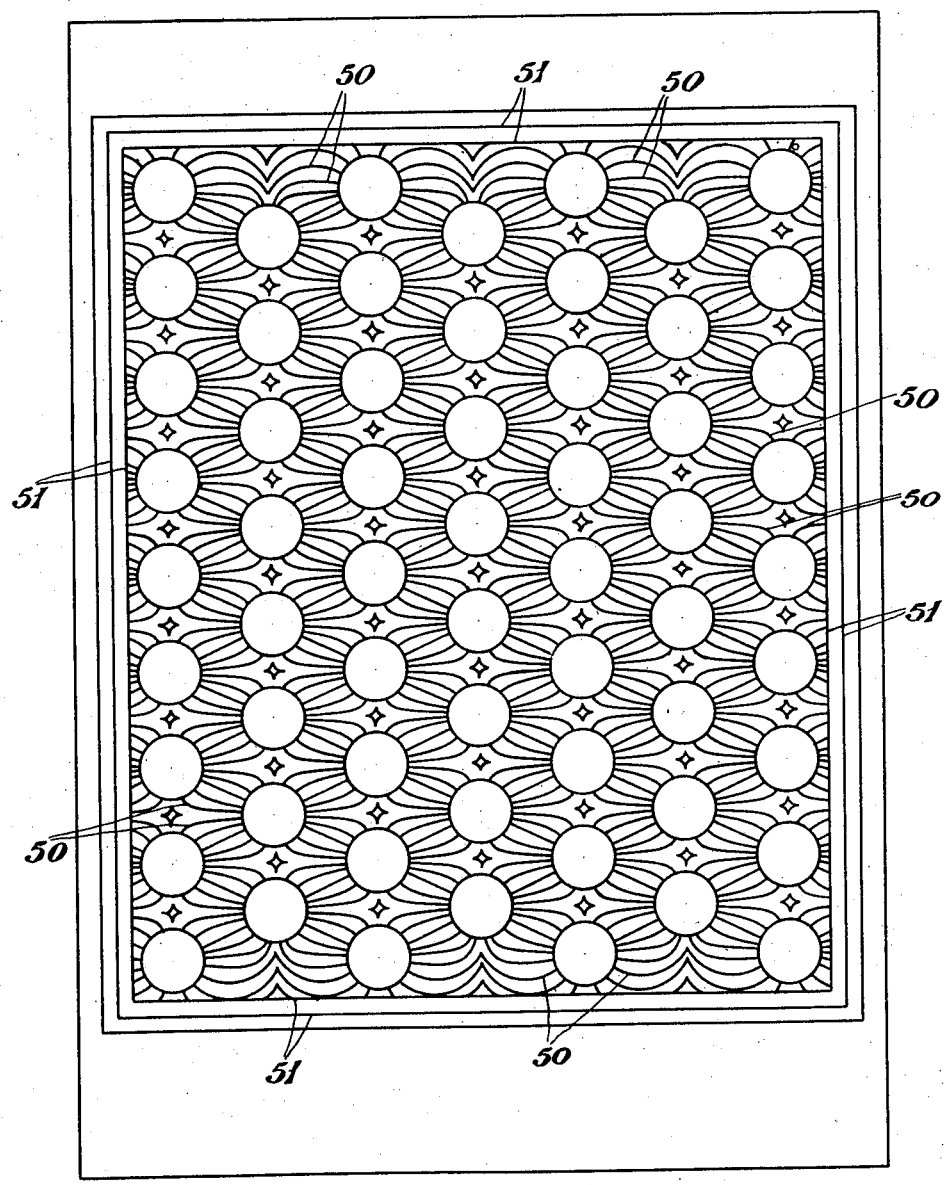
Figure 20 is a face view of a perforated filter plate having formed thereon by slightly raised lines, channels of a particular contour.

Figure 20 illustrates a face view of one of a series of perforated sheets of paper superimposed to form a pack and having formed thereon by slightly raised lines 50 channels of a particular contour, and by slightly raised lines 51 boundary or border lines.

By the expression so thin as to be substantially perfectly flexible I mean so thin that the sheets of whatever material they be can be folded upon themselves without permanent rupture or distortion.

What I claim and desire to secure by Letters Patent is:—

1. An edge filter comprising a pack of superimposed sheets having rugosities on their engaging surfaces provided with separate non-connected inlet and outlet passages in the interior of the block, a pressure head at each end of the pack between which the sheets are held, an inlet passage through one pressure head to said inlet passages in the interior of the pack, two outlet passages through the other pressure head one from the inlet passages in the pack and the other from outlet passages in the interior of the pack at another position, means for introducing the fluid to be filtered to the inlet passages and means for permitting at will either the escape of the filtrate from the outlet passages or the washing through of deposit from the inlet passages in the pack, the filtrate and the reverse flow passing between the rugosities of the engaged surfaces of the sheets leaving in the first case separated matter at the entering edges between the sheets and in the second case removing it therefrom.

2. An edge filter comprising a pack of superimposed sheets having rugosities on their engaging surfaces provided with separate non-connected inlet and outlet passages in the interior of the block, a pressure head at each end of the pack between which the sheets are held, an inlet passage through one pressure head to said inlet passages in the interior of the pack, an outlet passage through the other pressure head to passages in the interior of the pack at another position and provided with an outlet pipe having a valve, a second outlet passage through the latter pressure head to the inlet passages after passing between the rugosities of the engaged surfaces of the sheets in the interior of the pack and provided with an outlet pipe having a valve, so that by closing the second outlet valve and opening the first the filtrate from the liquid forced into the pack by the pump will be freely discharged and by closing the first outlet valve and opening the second the pump can be used to force liquid through the inlet passage of the pack to clean out the deposit therefrom.

3. A filter comprising a pack of sheets of material substantially impervious to the liquid being treated and of paper like thinness so as to be perfectly flexible, means for compressing said pack of sheets, an inlet for the impure liquid to be treated, means for delivering the impure liquid under pressure to said inlet, and an outlet for the filtrate so positioned relative to the inlet that the liquid is constrained to pass from the inlet through the spaces between the sheets to the outlet.

4. A filter comprising a pack of sheets of flexible material substantially impervious to the liquid to be treated, rugosities deposited on the surfaces of said sheets, means for compressing said sheets together, an inlet for the impure liquid to be treated, means for delivering the impure liquid to the inlet under pressure, an outlet for the filtrate so positioned relative to the inlet that the liquid is constrained to pass from the inlet through the spaces between the sheets to the outlet, the impurities being separated out at the inlet edges and in the spaces between the sheets.

5. For use in a pack filter of the type described superimposed sheets of perfectly flexible material impervious to the liquid to be treated when said sheets are in situ in the filter, said sheet having rugosities deposited upon its surfaces.

6. An edge filter comprising a pack of superimposed sheets of material so thin as to be substantially perfectly flexible and of such a nature as to be substantially impervious to the liquid to be filtered, each sheet being provided with a series of perforations and the pack held between two end plates, an inlet for the fluid to be filtered and an outlet for the filtrate, the perforations in adjacent sheets registering with one another to form inlet and outlet passages through the sheets which are placed respectively in communication with the inlet through one of the end plates and the outlet.

7. An edge filter comprising a pack of superimposed sheets of material so thin as to be substantially perfectly flexible and of such a nature as to be substantially impervious to the liquid to be filtered, each sheet being provided with a series of perforations and the pack held between two end plates, an inlet for the fluid to be filtered and an outlet for the filtrate, the perforations in adjacent sheets registering with one another to form passages through the sheets some of which are placed in communication with the inlet through one of the end plates while the others are placed in communication with the outlet.

8. An edge filter comprising a pack of superimposed sheets of material so thin as to be substantially perfectly flexible and of such a nature as to be substantially impervious to the liquid to be filtered, each of which is provided with a series of perforations and the pack held under compression between end plates provided with means for varying the pressure between them, and one with an inlet for the fluid to be filtered and the other with an outlet for the filtrate, the perforations in adjacent sheets registering with one another to form passages through the sheets some of which are placed in communication with the inlet in one pressure applying end plate while the others are placed in communication with the outlet in the other pressure applying end plate.

9. An edge filter comprising a pack of superimposed sheets of material so thin as to be substantially perfectly flexible and of such a nature as to be substantially impervious to the liquid to be filtered each of which is provided with a series of perforations and the pack held under compression between end plates, an inlet for the fluid to be filtered and an outlet for the filtrate, and means for supplying the fluid to be filtered under pressure, the perforations in adjacent sheets registering with one another to form passages through the sheets some of which are placed in communication with the inlet through one of the end plates while the others are placed in communication with the outlet, the inlet in the end plate being also placed in communication with the pressure supply of fluid to be filtered.

10. An edge filter comprising a pack of superimposed sheets of material so thin as to be substantially perfectly flexible and of such a nature as to be substantially impervious to the liquid to be filtered, a pressure head at each end of the pack between which the sheets are held, an inlet passage in the interior of the pack, an outlet passage in the interior of the pack at another position, means for introducing the fluid to be filtered to the inlet passage and means for permitting the escape of the filtrate from the outlet passage deposited material being arrested at the entering edges and between the sheets.

11. An edge filter comprising a pack of sheets of material so thin as to be substantially perfectly flexible and of such a nature as to be substantially impervious to the liquid to be filtered, a pressure head at each end of the pack between which the sheets are held, an inlet passage in the interior of the pack, means for holding said sheets close together, inlet passages in the interior of the pack, outlet passages in the interior of the pack at other positions, means for introducing the fluid to be filtered to the inlet passages and mean for permitting the escape of the filtrate from the outlet passages, deposited material being arrested at the entering edges and between the sheets.

12. An edge filter comprising a pack of sheets of material so thin as to be substantially perfectly flexible and of such a nature as to be substantially impervious to the liquid to be filtered, a pressure head at each end of the pack between which the sheets are held, an inlet passage through one pressure head connected by a valve controlled pipe to a pump to passages in the interior of the pack, an outlet passage through the other pressure head to passages in the interior of the pack at another position and connected to an external filtrate discharge pipe.

13. In the manufacture of filtering elements for edge filters, the step which comprises lithographing a design of spaced figures upon a face of a filter element to provide spacing projections.

In witness whereof I affix my signature.
HENRY SELBY HELE-SHAW.